W. W. JONES.
RESILIENT WHEEL.
APPLICATION FILED SEPT. 2, 1915.
1,221,995.
Patented Apr. 10, 1917.
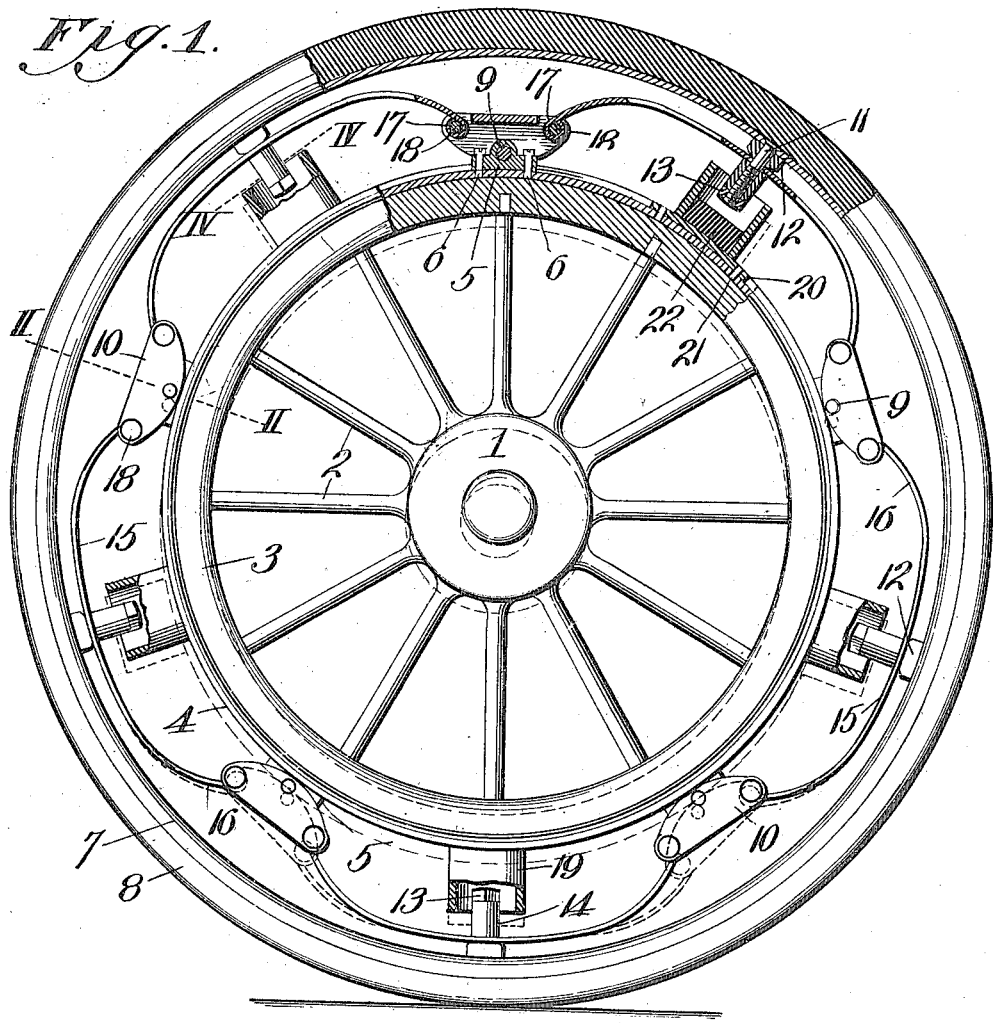
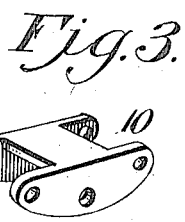
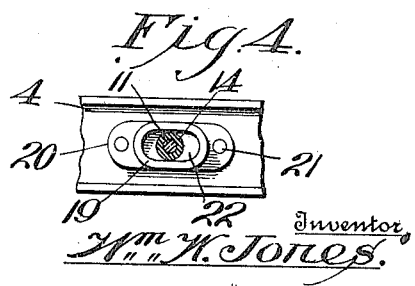

UNITED STATES PATENT OFFICE.

WILLIAM W. JONES, OF MARYVILLE, MISSOURI, ASSIGNOR OF ONE-FIFTH TO ROY E. GEARHART AND ONE-FIFTH TO FLEMING CARPENTER, BOTH OF MARYVILLE, MISSOURI.

RESILIENT WHEEL.

1,221,995. Specification of Letters Patent. Patented Apr. 10, 1917.

Application filed September 2, 1915. Serial No. 48,720.

*To all whom it may concern:*

Be it known that I, WILLIAM W. JONES, a citizen of the United States, residing at Maryville, in the county of Nodaway and State of Missouri, have invented certain new and useful Improvements in Resilient Wheels, of which the following is a specification.

This invention relates to resilient or cushion wheels for automobiles and the like, and more especially to that class of wheels comprising an outer or road portion, an inner portion for carrying the load, and springs interposed between the said portions and adapted to normally sustain the inner portion in concentric relation to the outer portion but capable of movement upward and downward within the latter for the purpose of absorbing the shocks or jars incidental to the travel of the wheels over rough or uneven ground or surfaces, my special object being to produce a wheel of the character outlined in which the springs are so arranged that they effect an equitable distribution of the up and down and torsional strains which are imposed upon the wheel in service.

A further object is to produce a resilient wheel of the character outlined, in which all of the springs shall coöperate to withstand lateral or buckling strains, such as are imposed thereon when the car is making a turn.

Another object is to produce a resilient or spring wheel which is practically noiseless in travel and embodies the desirable features of simplicity, strength, durability and inexpensiveness of construction.

With these general objects in view the invention consists in certain novel and peculiar features of construction and combinations of parts as hereinafter described and claimed; and in order that it may be fully understood reference is to be had to the accompanying drawing, in which:

Figure 1, is a view partly in side elevation and partly in central vertical section of a resilient wheel embodying my invention.

Fig. 2, is a section taken on the line II—II of Fig. 1.

Fig. 3, is a detail perspective view of one of the rocker frames or links of my improved wheel.

Fig. 4, is a section taken on the line IV—IV of Fig. 1.

Referring to the drawing in detail 1 indicates the hub, 2 the spokes and 3 the felly of a wheel, these parts in conjunction with a metallic rim 4 shrunk or otherwise rigidly secured on the felly, constituting the inner member of my resilient wheel.

Arranged at equidistant points around the rim, which is preferably of channel type, is any desired number of blocks 5, the same being shown as secured rigidly to the rim by screw bolts or rivets 6, though it will be understood the connection may be made in any suitable manner.

The outer member which is of considerably larger diameter than the inner member, consists of a rim 7 of channel type, and a tread or tire 8, preferably of rubber or equivalent material and firmly secured in the outer or channeled side of rim 7.

To secure the inner and outer members in operative position, the latter is arranged to inclose the former in substantially concentric relation.

9 indicates pivot pins extending transversely through blocks 5, and pivoted on said pin are rocker frames or links 10.

11 indicates bolts extending radially inward from the outer member at equal distances apart and equal distances from adjacent rocker frames or links, and to anchor said bolts rigidly, clamping collars 12 are secured upon them until limited by contact with the inner side of rim 7, the inner ends of the collars being preferably rounded, as shown.

Nuts 13 are secured on the inner extremities of the bolts 11, to clamp tubular washers 14 fitting on said bolts, firmly against semi-elliptic springs 15 fitted on the bolts and against the rounded ends of collars 12, the extremities of said springs being bowed sharply inward as at 16 and terminating in eyes or loops 17 pivotally receiving cross pins or bolts 18 of the rocker frames or links, it being noticed that by this arrangement any lateral or buckling strain is received edgewise by the springs and that such strain or force is transmitted by the springs to the outer member near the outer ends of bolts 13, and to the inner member through the rocker frames or links.

19 indicates elongated sockets provided with lugs 20 secured by rivets 21 to the rim 4, said sockets receiving the inner ends of the bolts 11 and bracing the same against lateral movement without interfering with the vertical vibratory movement which they have in the travel of the wheel, and in order to coöperate with the springs in resisting excessive up and down movement of the outer member, the sockets contain rubber or equivalent sound-deadening elastic buffers 22, it being apparent that contact between one of the bolts 11 and the companion buffer 22 will only occur when the same are in or near the vertical plane of the axis of the wheel.

When a car equipped with wheels of the type described, is loaded, the inner members of the wheels will occupy a slightly eccentric relation with respect to the outer members, that is to say the axes of the inner members will occupy positions slightly depressed below the axes or centers of the outer members, this eccentric relation of a wheel being indicated in an exaggerated degree by dotted lines, in Fig. 1, in order that the action may be more readily apparent. As the car travels along the body in effect floats, owing to the fact that as the wheels ride over obstructions and cavities or depressions in their paths, the springs flex and reflex and thereby relieve the body of shocks and jars to which it would otherwise be subjected.

Assuming that the wheel shown has encountered an obstruction and mounted to the top of the same, it will be seen by reference to the dotted lines, that the spring underlying the axis of the wheel and the lower portions of the adjacent springs, will be subjected to pressure or force which tends to straighten them, and that the springs above the axis will be subjected to force tending to bow them to a greater extent than they are bowed in their normal position, it being noted that the springs which at the time are forward and rearward of the axis are also subjected to strain and therefore coöperate in the cushioning of the inner member.

It will be apparent that the starting of the car under power will be cushioned with a wheel of this character, as the springs will yield imperceptibly when the power is applied and effect a gradual starting of the wheels. This action however is common in other spring wheels of this general class or type.

If it is desired to transform the wheels of an ordinary pneumatic tired vehicle into wheels which possess the desirable qualities of resiliency and capacity of continued service regardless of punctures, the rim of the inner member as described, can be mounted upon the felly or rim of the wheel to be transformed. The outer member, with or without its elastic tread portion, will be fitted in the pneumatic casing, not shown, though to so dispose the outer member it will of course be essential that it be split at some point so that it can be compressed sufficiently to enter the casing, it being also obvious that to place this resilient appliance in a pneumatic casing, one of the springs or rocker frames or links would have to be removed and afterward replaced, though it is possible that by detaching the adjacent ends of two of the springs from a rocker frame or link, the parts could be assembled and said springs subsequently secured to the proper rocker frame or link. The use of a pneumatic casing or its equivalent, would be desirable in any type of construction of this wheel, as it would give the wheel the appearance of having a pneumatic tire and guard against the entrance of mud between the inner and outer members of the wheel.

From the above description it will be apparent that I have produced a resilient wheel embodying the features of advantage enumerated as desirable, and which is susceptible of modification as regards its form, proportion, detail construction and organization of parts, without departing from the essential spirit and scope or sacrificing any of the advantages of the appended claim.

I claim:

A resilient wheel, comprising an inner member and an outer member surrounding the inner member, bolts extending radially inward from the outer member at equi-distant points, collars secured on said bolts and bearing against the inner face of the said outer member, outwardly bowed springs fitting midway their length upon said bolts and against said collars, nuts secured on the inner ends of said bolts, washers on the bolts and clamped by said nuts against said springs to clamp the same against the inner ends of said collars, bearing blocks secured on the said inner member at the circumferential surface thereof, rock frames mounted on said blocks and secured at their opposite ends to the adjacent ends of adjacent springs, socket members secured to the inner member and receiving the said nuts and the inner ends of the said bolts and washers; the sockets being elongated circumferentially to accommodate limited circumferential movement of the said inner member independent of the said outer or surrounding member, and rubber buffers secured in said sockets to receive the impact from the inner ends of the said radial bolts and the nuts thereon.

In testimony whereof, I affix my signature, in the presence of two witnesses.

WILLIAM W. JONES.

Witnesses:
G. Y. THORPE,
K. M. THORPE.

Copies of this patent may be obtained for five cents each, by addressing the "Commissioner of Patents, Washington, D. C."